United States Patent [19]
Moore

[11] 3,782,768
[45] Jan. 1, 1974

[54] TUBULAR, SHOCK-ABSORBING BUMPERS

[76] Inventor: Alvin Edward Moore, 916 Beach Blvd., Waveland, Miss. 39576

[22] Filed: Apr. 5, 1971

[21] Appl. No.: 131,025

Related U.S. Application Data

[63] Continuation-in-part of Ser. No. 796,482, Feb. 4, 1969, Pat. No. 3,575,251.

[52] U.S. Cl. ................ 293/71 R, 293/62, 293/63, 293/88, 293/89, 114/219
[51] Int. Cl. .............................................. B60r 19/10
[58] Field of Search ................ 114/219; 267/116, 267/139, 140; 293/1, DIG. 2, 60, 62, 63, 64, 70, 71, 72, 88, 89

[56] References Cited
UNITED STATES PATENTS

| | | | |
|---|---|---|---|
| 3,666,310 | 5/1972 | Burgess et al. | 293/71 R |
| 1,195,857 | 8/1916 | Royston | 114/214 |
| 1,623,888 | 4/1927 | Pasini | 293/62 X |
| 2,916,324 | 12/1959 | Graham | 296/28 |
| 3,493,257 | 2/1970 | Fitzgerald et al. | 293/71 R |
| 1,753,411 | 4/1930 | Gunn | 293/71 R |
| 1,793,680 | 2/1931 | Cooke | 293/62 |
| 2,875,721 | 3/1959 | Downey | 114/219 |
| 3,541,800 | 11/1970 | Walker et al. | 61/48 |
| 3,475,914 | 11/1969 | Porter | 61/46 |
| 3,079,884 | 3/1963 | Miller | 114/219 |
| 2,842,085 | 7/1958 | Norman | 114/219 |

*Primary Examiner*—Gerald M. Forlenza
*Assistant Examiner*—Robert Saifer

[57] ABSTRACT

Shock-absorbing bumper means for cars, boats or other vehicles, comprising resilient, tubular cushioning members of optional variation in cross-sectional shape, containing gaseous material that may be: pressurized air or other gas; gas-cell-containing foam plastic; or a gas-containing mass (optionally pressurized) of separate fibers, globules, or small-diameter elements (very small flexible tubes containing gaseous material or elongated rods of resilient rubber or other flexible or crushable material). The cushioning means may be only at the front and/or rear of the vehicle or may extend around it, with or without integral junctions between the tubular elements. The tubular members may have axes that are: horizontal; vertical or upright; optionally either upright or horizontal; or they may comprise outer horizontal tubular sheaths and inner vertical tubular elements. The tubular-member material may comprise: ductile or resilient metal — e.g., copper, lead, soft iron, resilient steel, with or without mesh or other reinforcing material; or flexible plastic (preferably fabric-reinforced rubber). The tubular members may comprise flat-ended tubular elements that are either separate tubes or tubular links in a bumper band around a portion or all of the vehicle, some of these links optionally comprising a fender above a wheel and a running-board-like side bumper-step. The tubular elements may comprise relatively wide, spring-like bands of resilient steel or the like, acting when flexed to compress fibers or other small filler elements.

39 Claims, 15 Drawing Figures

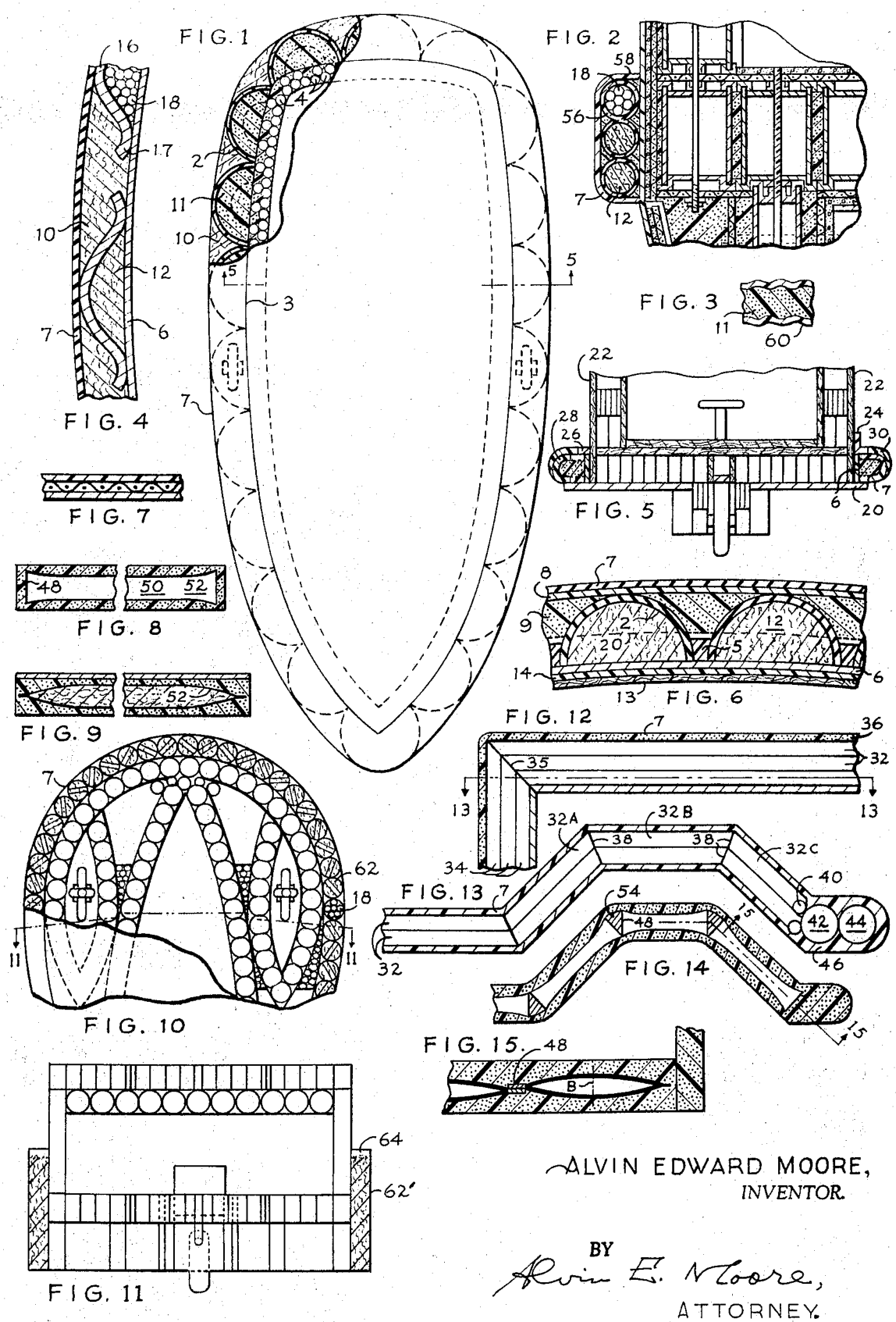

TUBULAR, SHOCK-ABSORBING BUMPERS

This application is a continuation-in-part of application Ser. No. 796,482, filed on Feb. 4, 1969 (Pat. No. 3,575,251, Apr. 20, 1971), comprising parts that were divided from that application. FIGS. 4 and 11 are the same as FIGS. 7 and 16 of application Ser. No. 796,482; except for a slight, drafting-convenience change. FIG. 10 is the same as the forward vehicular part of FIG. 10 of the prior application; FIGS. 2 and 5 are the same as the bumper parts of FIGS. 8 and 3 of the earlier application; FIGS. 1 and 6 are the same as the bumper parts of the earlier FIGS. 1 and 4, except that; instead of being indicated as gas alone, the shock-absorbing gaseous material that is exterior of the tubular elements is now shown as fibers in FIG. 1 and as foam plastic or globules in FIGS. 2 and 6; and FIG. 3 is the same as earlier FIG. 2A, except that the end cap of the tubular element in FIG. 2A is not indicated in FIG. 3.

The present invention pertains to bumper means for cars, boats or other vehicles. In collisions, the currently used car bumpers are easily damaged and disfigured; and in bending or breakage under heavy blows they transfer disruptive forces to car bodies. Present-day marine vessels, aircraft and space craft also are subject to great damage in collisions.

In view of these facts, some objects of this invention are to provide: (1) resilient bumper means adapted for use at the front and rear of a vehicle or all around it; (2) shock-absorbing bumper means comprising resilient tubular members; (3) such bumper means in which resilient tubular members contain gaseous material which optionally may be compressed gas, foam rubber, fibers and air or globules and air; (4) such shock-absorbing means having resilient tubular members that comprise tubular elements having horizontal axes; (5) such bumper means in which the tubular members comprise upright-axes tubular elements; (6) such shock-absorbing means in which the tubular members comprise inflated links that are end-connected and bridge over a wheel. Other objects of the invention will be apparent in the following specification and the accompanying drawings.

In these drawings:

FIG. 1 is a top plan view of a vehicle (for example, a car, boat, aircraft or spacecraft), shown as having part of its forward end broken away and in section along a horizontal plane between the top and bottom of the craft, thus illustrating one form of the invented bumper means;

FIG. 2 is a detail view in vertical, transverse section of a portion of a vehicle, showing a second form of the invented shock-absorbing cushion;

FIG. 3 is a detail, sectional view of a corrugated form of resilient, shock-absorbing tubular element optionally usable in the invented bumper;

FIG. 4 is a detail view in horizontal section of a third form of the bumper, utilizing bowed, spring-like, flat-ended tubular elements;

FIG. 5 is a view in vertical, transverse section of a vehicle — from a plane comparable to that indicated at 5—5 in FIG. 1, shown with the craft's top part broken away, illustrating a form of the bumper means;

FIG. 6 is a detail view in horizontal section, partly broken away, of another form of the impact-cushioning shield;

FIG. 7 is a detail sectional view of one form of the wall material of the tubular members;

FIG. 8 is a detail view in section from a tube-center, vertical plane of a form of the bumper utilizing an inflated tubular element that has tube-flattened ends;

FIG. 9 is a detail view in section from a horizontal plane, showing the type of tubular member of FIG. 8 as containing fibers, mixed with gas which optionally may be under above-atmospheric pressure;

FIG. 10 is a detail plan view partly broken away in horizontal-plane section of the forward part of an upright-axis form of the bumper means;

FIG. 11 is a view in vertical-plane section from the planes indicated by the arrowed lines 11—11 of FIG. 10;

FIG. 12 is a detail view in horizontal-plane section of a form of the tubular bumper means that utilizes elongated tubular elements, and optionally provides a cushioned, running-board-like step at the side of a vehicle;

FIG. 13 is a detail view in vertical-plane section, from a plane comparable to that indicated at 13—13 in FIG. 12, showing an optional type of bumper means that bridges over a space for a wheel or the like and provides a running-board-like step;

FIG. 14 is a detail view in vertical-plane section of a second form of the general type of impact shield of FIG. 13, utilizing flat-ended tubular elements; and FIG. 15 is a sectional view from the planes indicated at 15—15 in FIG. 14, in a scale enlarged from that of FIG. 14.

In each of the disclosed forms of the invented bumper assembly;

(1) The tubular bumper means optionally may inclose the whole perimeter of a vehicle body — as in FIG. 1 — or may extend alongside only a desired portion of the perimeter — for example, at the front or rear. (2) Each of the tubular members optionally may comprise only a single tubular element (as in FIGS. 8, 9, 10 and 11), or a plurality of end-joined tubular elements (as in FIGS. 1, 5, 6 and 12 to 15), or unjoined tubular elements in a bumper sheath (as in FIG. 4 or optionally in FIG. 1). (3) The gaseous material contained interiorly of each of the tubular elements or exteriorly of the tubular elements (in the bumper sheath) optionally may be: (A) air, helium or other gas (preferably at a substantial pressure above that of the atmosphere — for example, in the range of 10 to 20 pounds per square inch); (B) such optionally pressurized gas within the tube or outer sheath, mixed with small, impact-movable filler elements of cross-sectional areas that are considerably smaller than the maximum area across their container (for example, less than an eighth of a tubular element's maximum cross section), these movable elements optionally being resilient, or non-resilient and flexible (e.g., ductile) or frangible — for example, plastic or fiberglass or asbestos fibers, steel wool, excelsior or the like (preferably resilient), hollow plastic or glass or metal globules, expanded shale, natural or synthetic feathers or the like, small-diameter curved or straight tubes or rods, pellets or the like; or (C) gas-cell-containing foam plastic, preferably resilient. (4) The material of the tubular elements optionally may be: metal (resilient in some constructions, ductile in others), optionally backed by flexibly-bonded mesh or other fabric or impregnating fabric; dense, flexible plastic (optionally reinforced by fibers), backed by mesh or other fabric, or as plastic that impregnates fabric; or two or more plies of fabric and resilient rubber or other plastic (like the material or rubber hose or of tire casings). (5) When inflated by pressurized gas and having gas-permeable material, the tubular elements preferably are repeatedly inflatable thru gas-inlet, tire-like valves. And (6), when inflated by pressurized gas the tubular elements that comprise ductile or resilient, impermeable-to-gas metal or dense plastic have gas inlets (valves or small inlet tubes) that preferably are permanently sealed over by bonding material (the inlet tube may be flattened and sealingly welded, soldered, brazed or epoxy-glued — or if a valve is used its outer opening is filled and sealed with such bonding material).

FIGS. 1, 4, 6, 10 and 11 illustrate tubular members, each of which comprises a single, resilient tubular element (optionally of any of the above-described tube materials) that has an upright axis. In FIG. 1, each tubular element, 2, has the horizontally cross-sectional shape of a segment of a circle. The radius of this partly circular cross-sectional arc may be the same throughout its vertical extent (in which case the tubular elememt is part of a cylinder); or this radius may be largest at the tubular element's middle horizontal plane and from this plane decrease both up and down (when the element may be like part of an automobile tire — for example, half of a tire casing). In either construction its vehicle-side edges are vertically arranged (straight and in a vertical plane, when the element is particylindrical; curved but in a vertical plane when shaped like part of a tire casing). These tubular elements optionally extend around all or part of the periphery of the chassis or composite chassis-body of the vehicle (which may be exteriorly curved and have tubular walls 4, as shown, or may have any other desired shape and wall construction). Their vertical edges may be joined by bonding material (preferably epoxy or flexible plastic as shown at 5 in FIG. 6) and may be also bonded to the vehicular body or to a long, properly curved (or else planar) strip 6, of metal or plastic, that forms part of the bumper means.

Preferably this bumper means is manufactured before its assembly with the car body; but in any event, the waterproof fabric 7 is glued (as at 8) to the interior bumper structure and to or over the strip 6 and extends over the top, bottom and outer surfaces of the tubular-element springs 2.

The flexible bumper sheath thus formed by 7, and the curved cavities of the elements 2 are filled with shock-absorbing gaseous material of one or more of the above-described types. The gaseous material that is exterior of the tubular elements — between them and the sheath 7 — may be: pressurized or unpressurized air; foam rubber (9); or air mixed with small fiber filler elements (e.g.), fibers or other slender filaments, as indicated in FIG. 1 at 10. The gaseous material within the interior surfaces of the elements 2 may be foam plastic, as shown at 11, but preferably comprises air mixed with filler elements, for example, fibers or other slender filaments or globules (12 or 18). When the spring-like tubular elements 2 are of strong resilient metal or several-ply-reinforced resilient plastic these filler elements 11 or 18 (which may be resilent or weakly or strongly frangible and thus absorb some impact force), are preferably mixed with air that is not pressurized; but when the seal of the bonding material between the inner upright edges and the strip 6 is complete and strong these tubular elements 2 are preferably filled with gas at above-atmospheric pressure. When gas-cell-containing foam plastic (11) is used as the interior gaseous material it preferably is pressurized.

After the bumper means is sub-assembled the strip 6 is fixed to the car body 13 (the body proper or chassis) by bonding material (welding, brazing, solder, or expoxy putty 14).

In the horizontally sectional FIG. 4 the spring-like tubular elements 16 (which may be springs of weakly resilient steel) are similar in function to the elements 2, but the flat ends 17 are curved to facilitate their sliding when under impact along the bumper strip 6 and preferably are not joined by expoxy or other bonding material. A vertical cross-sectional plane thru any part of each of these tubular elements 16–17 intersects its outer and interior surfaces in a pair of parallel vertical lines; and preferably the spring's width is the same along all these lines and is equal to the uniform vertical width of the strip 6. Thus when the springs are bowed inward by an impact their vertically wide parts, which are approximately equal to the vertical dimension of the bumper, efficiently compress the resilient, flexible, ductile or frangible filler elements (e.g., 12 or 18) that are mixed with air on the interior of the tubular element. The numeral 12 indicates either fibers (or gas-cell-containing foam plastic); the numeral 18 (in FIGS. 4, 2 and 10) represents globules (globular elements), small fiber tubes (tubular elements) of substantially rigid (crushable) or resilient or non-resiliently flexible plastic, or small, resilient or crushable rods or filaments of plastic that preferably are curved along their lengths.

FIGS. 5 and 12 to 15 indicate resilient bumper means which provide both absorption of impact from the side of a vehicle and a running-board-like step at the side. In FIG. 5 the bottom of the vehicular body is shown as projecting laterally at 20 from each of the side walls 22. Optionally this may be a separate bar, having a length substantially equal to that of the body, welded or bolted either to the body proper or to a chassis. Spaced above this element 20, and having the same length, there is a second elongated metal element which optionally may be an angle iron 24 or a flat bar 26. Between the inner planes of these two metallic pieces (20 and 24, or 20 and 26), the major parts of the shock-absorbing cushion and the flexible support for the step are located. These comprise: the plastic or metallic bumper attachment strip 6 (glued and/or otherwise attached to 22); resilient tubular elements of any of the optional types of this invention; step-strength-providing gaseious material in the interior and on the exterior of the tubular elements; and the flexible, waterproof bumper sheath 7 that incloses the bumper strip, tubular elements and gaseous material. As illustrated, the tubular elements 28 are shaped like halves of an automobile tire, and therefore this FIG. 5 may be considered as a sectional view from the plane 5—5 of FIG. 1; but any of the other disclosed forms of tubular elements may be substituted for 28. Epoxy-glued or flexible-rubber-bonded to the top of the sheath 7 and to a lateral, exterior edge of metal piece 26 (or 24) there is a flexible outer element 30, which is a flexible running board in the form of a long strip of rubber and fabric that is capable of withstanding wear from shod feet, and for example may be of the material commonly made for stair treads. On receiving a severe impact from the side: this strip 30 (which is curved downward a bit over the top of the tubular elements) resiliently yields downward, and at the same time the main cushioning part of the bumper means resiliently caves inward, toward the strip 6; and in its inward portions it compresses between the spaced metallic pieces, 20 and 24 (or 20 and 26).

In FIG. 12 the bumper-and runing board means comprises orthogonally-arranged tubes 32 and 34 that are joined at 45° angles. Each of the tubes 32 and 34 has an end edge cut at 45° to its axis; and to this edge a flat, curved-periphery piece of the same material as that of the tubes (plastic or metal) is sealingly bonded. When the tubes are of metal they optionally may be connected by short, concentric, outwardly curved tube connections.

The tubes 32 and 34 are filled with gaseous material of one of the above-described types (pressurized gas as exampled in FIG. 12); and their adjoined, 45° edges or edge-pieces are bonded together at 35. Over the resulting assembly of tubes the sheath 7 is located, and between it and the tubes cellular foam plastic 36 (or other gaseous material) is located. At the elongated side of the vehicle, running-board-like steps are completed by use of elements like 20, 24 and 30 of FIG. 5.

Sectional FIG. 13, viewed from a plane comparable to 13—13 of FIG. 12, illustrates the manner in which tubular elements 32A, 32B and 32C may be formed into an upward-jutting section of the bumper means, bridging over space for a wheel. These tubular elements may have flat, peripherally-curved edge-pieces of the above-described type that are sealingly bonded to the tubes' edges and also to each other at upright angles 38. In the inventive form of this figure: thee major part of the running-board-like step is shown as comprising tubes 32; the forward (or rear) ends of tubular elements 32C are sealingly bonded to a pair of elongated, resilient, disk-ended tubes 40; these tubes 40 are bonded to the larger tube 42, which in turn is flexibly connected to tube 44. Within the bumper sheath 7, resilient plastic 46 incloses all the tubular elements. The length of the tubes 42 and 44 is substantially equal to the width of the vehicle; and together with elements 7 and 46 they form the front (or rear) bumper.

In the bumper means of FIGS. 14 and 15 the tubular elements utilized have tube-flattened, sealed ends 48 which are similar to those of FIGS. 8 and 9. These FIGS. 8 and 9 illustrate a simple form of the bumper that may be attached to the front, rear or side of a vehicular chassis, composite chassis-body or body proper. As here shown, the tubular element in its greatest cross-sectional area has a middle cylindrical portion 50, tube-flattened ends 48, and a portion 52 that smoothly curves from the cylindrical portion to each end 48. As indicated in FIG. 8, from an end of the cylindrical part this portion 52 curvingly flares outward in the plane of the flattened ends; and as shown in FIG. 9, from that end it curvingly slopes inward in its middle planes that are normal to the flattened ends. The axial length of each of these outward and inward curving inclinations — the length along the axis of the tubular element from a cross-sectional plane of greatest tubular area to a flat end — depends on the diameter of the tube when it has a circular-in-cross-section shape, as at the cylindrical part 50. The substantially exact ratio of this length to the diameter may be mathematically calculated, but the present inventor has empirically determined that always exact and estimated the length as at least twice the diameter; and of course the width (maximum dimension) of each of the flat end portions is approximately 1.57 times the diameter. Thus, a flat-ended bumper tube of the type shown in FIGS. 8 and 9 that is 8 inches in diameter and 8 feet long has: two upright flat ends of a little over 12½ inches in upright dimension; an elongated middle, 8-inch, cylindrical part; and two curvingly-inclined portions between the cylindrical part and the flat ends that have an exact ratio to the 8-inch diameter.

The present inventor has discovered the following advantages in this type of tubular element, which, with its flat ends upright, are of especial value in resilient bumpers that are subject to long-repeated flexing and efficiently absorb the shocks of many impacts: (1) Because of its flat-end construction it may be impact-bent at a curved part without wrinkling or damage of its material and without change in its axial length (either the tube is of resilient metal or resilient plastic or else it is of ductile material and is resilient because it is filled with gaseous material under pressure; therefore after the impact it returns to its former shape). (2) It may be made of impermeable, distortable material such as metal or dense plastic without damaging wrinkling of the material. (3) It may have highly ductile lead-tube or lead-and-fabric (lead-tube-lined) walls that permanently contain gas at above-atmospheric pressure (with or without small further elements mixed with the gas). (4) The tubular member may be: flattened throughout its length from an originally cylindrical shape (thus removing the air from the tube); sealed at its flat ends by bonding material (welding, solder, brazing, epoxy putty or the like). (5) it may be inflated thru a gas inlet with helium or the like (thus, without a vacuum pump or damaging wrinkling of the material, the tube may be efficiently inflated with non-aerial gas).

The tube originally may be made by extrusion, or by bending a rectangular, thin-metal sheet bank around a cylindrical mandrel and lap-welding or otherwise sealingly bonding its upper, lapped edges. When its longer-side edges are welded the welding is preferably of this lap-weld type, and should be ductile so as to yield without fracturing the seal when the tube changes its shape. When the welded tube is flattened its flat ends perferably are located in planes that are approximately parallel to the band of the lap weld.

If the tubular element has a circular-in-cross-section middle part it necessarily has a length at least equal to the sum of the axial lengths of its two curvingly inclined portions. When the tube is shorter than this sum, the sectional plane of the tube's greatest bulge is at the center of its length and intersects the tube in an endlessly curved perimeter that in cross section is not circular but instead is an ellipse, with its major dimension in the bonding plane between the lapped plies of the flat ends. With such a central-plane ellipse the tube necessarily is shorter than the sum of the potential lengths of its curvingly inclined portions if it had a circular-in-cross-section middle part).

If the wheel-bridging tubular elements of FIG. 14, for example, are originally eight inches in diameter, before their ends are flattened, each of these inflated flat-ended tubes has no circular-in-cross-section portion; instead the vertical cross-sectional plane of its greatest bulge, at the center of its axial length (indicated at B in enlarged FIG. 15), intersects the tubular element in an ellipse whose smallest cross-sectional dimension is that shown in FIG. 15 at B. In this figure the bonded flattened tube ends, 48, somewhat extended in the direction of the tube's axis, are indicated as overlapped and bonded together. In FIG. 14 the bonding material 54 is indicated as welding, solder or brazing; this type is preferably used when the tubular elements are metallic.

In FIG. 2 another, elongated form of the horizontally-positioned bumper tubes is indicated at 56. Although such tubes may be limited to front and rear bumpers only, they are here indicated as on the side of a vehicle (optionally providing a running-board-like step portion at 58); and preferably they endlessly extend all around the craft. They are shown as comprising vertically stacked tubes, and if desired they also may be pluralized horizontally with two or more tubes horizontally spaced from the vehicular body. As shown, the tubes contain filler elements of the above-described type, mixed with air or other gas. This gas preferably is under pressure considerably above that of the atmosphere — e.g., at 10 to 20 pounds per square inch. These tubes may be made, like rubber water hose, of plies of fabric and plastic (preferably dense plastic); and they may have gas-inlet valves for repeated inflation. But preferably they comprise ductile metal — optionally as a metallic inner tube that lines an outer envelope of mesh or other fabric, as in FIG. 7 — and they are permanently inflated and sealed. Optionally, these tubes, as well as those of FIGS. 6 and 10 to 12, may be corrugated, as indicated in FIG. 3 at 60, here optionally shown as without an encasing fabric envelope.

In FIG. 10 upright-axis tubes 62 are shown which may have disked ends as indicated in FIG. 11; or they may be of the flat-ended type of FIG. 8. Currently, the inventor prefers the flat-ended form with the planes of the flattened plies parallel to planes that are tangential to the curved body or chassis-body surface. And when used in land vehicles he prefers the length of these upright tubular elements (either of the FIG. 8 or FIG. 11 type) to be shorter than they are shown at 62' or in FIG. 8. The tubes then have their greatest bulges in the form of ellipses, with their major elliptical dimension, as well as their flat ends, lying in planes parallel to planes that are tangential to the horizontal cross-sectional curve of the body's surface. As illustrated in FIG. 11, each of the tubular elements has a top clearance at 64 (preferably deeper than here shown), into which when the tube receives impact some of the filler elements it contains rise, thus harmlessly distributing some of the force of the blow in an upward direction. After the impact the filler elements settle back into place. Preferably the tubes 62 of FIG. 10 (48–52 or 62') are strongly inflated with gas (around the fibers, globules or other filler elements), as described above.

Preferably, the tubular elements of this invention are permanently sealed and inflated, and comprise ductile or resilient metal. Copper is a good material; but currently thin lead, continuously and tubularly lining an exterior, lead-reinforcing envelope of mesh or other fabric, is preferred. Lead has three important advantages of this bumper-tube use: (1) it is substantially impermeable to gas; (2) an inner tube easily may be made of thin sheet lead, the joints permanently sealed by simple application of heat, and a fabric envelope glued or otherwise held on its exterior surface and (3) (critically important in metallic, impact-cushioning metallic bumper tubes) a somewhat thin tube of lead may be bent thousands of times without fracture, and after each impact resume its shape because of the resilience of the pressurized gaseous material it contains.

One method of making the leaden tubular article comprises the following steps:

1. bending a thin, rectangular sheet of lead around a cylindrical mandrel, overlapping its longer edges at the top of the mandrel;
2. heat-joining the lapped edges by application of heat to them — e.g., from a blow torch or soldering iron;
3. drilling a hole for a short gas-inlet tube (optionally, a valved tube like the metal part of an automobile tire valve), placing the gas inlet in the hole, and sealing around the inlet by application of sufficient heat at the hole to melt lead there and thoroughly seal around the inlet (extra molten lead or solder may be added around the valve);
4. removing the mandrel, and flattening the tube, preferably throughout its length;
5. heat-joining the tube-flattened end plies, as in step 2, into a sealed, welded band;
6. forming a sack-like fabric envelope (e.g., of nylon, asbestos, fiberglass or copper, mild-steel or aluminum mesh) — in rectangular shape and of a size to snugly fit over the flattened lead tube;
7. diping the lead tube in plastic cement (e.g., rubber cement — "Pliobond" or the like);
8. placing the flattened tube inside the envelope;
9. soaking the fabric-backed tube in the cement used in step 7 long enough for the liquid to thoroughly impregnate and coat the fabric (this fabric is preferably rather porous, and may be small-mesh copper, aluminum or iron network — for example, screen-wire fabric or hardware cloth, with the wires preferably of a diameter a little larger than that of commonly-sold screening);
10. after the plastic cement sets, inflating the tubular member with air, helium or other gas at above-atmospheric pressure; and
11. permanently sealing the gas-inlet tube (it is is valved by placing lead or solder over its outer opening; if not valved by clamping, flattening and welding together tube-flattened plies of the outer end of the small tube).

Another method of making the tubular member comprises substitution for the above steps 1, 2 and 4 a step of extruding a seamless tube (or purchasing an extruded tube); and steps 3 and 5 to 11 are unchanged.

Another process comprises:

1. cutting a rectangular piece of nylon, fiberglass, asbestos cloth, wire-mesh or other fabric not easily burned at the temperature of molten lead (327.4°, centigrade);
2. pouring molten lead in a thin layer on the entire surface of the fabric;
3. after the lead cools, running the composite material between rolls, flattening and smoothing the lead;
4. bending the lead-and-fabric sheet over a cylindrical mandrel, with the lead sheet next to the mandrel and overlapping its longer edges.

Steps 5 to 10 are substantially the same as steps 2 to 5, 10 and 11 of the first above-described method.

A modification of the last-described of the above methods, after step 3, comprises: folding (doubling) the lead and fabric sheet along the central elongated line of the original lead-and-fabric rectangle (thus forming two lead-lining plies that are in contact); heat-joining the contiguous, long-side edges of the lead into a narrow, sealed, side band, and heat-joining the end edges of the lead into end bands, which may be wider than the side band and optionally drilled with attachment holes (not breaking the end seals).

In the claims, unless otherwise qualified: the term "tubular member" refers to a single tube or concavely curved element, of any cross-sectional shape, or a set of two or more end-connected tubular elements or links, of any cross-sectional shape; "tubular element" signifies: a single tube or concavely curved element or a tubular or concavely curved part or link of a composite tubular member, of any cross-sectional shape; "plastic" means: any natural or synthetic plastic, including rubber, and plastic-containing reinforcing elements; "fabric" signifies: cloth, woven-wire network or any other mesh, including fibrous or plastic netting and expanded metal; "upright" means vertical or at an angle between 45° and vertical; "bonding material": welding, solder, brazing, molten lead that has set, epoxy putty, glue or other bonding means; "gaseous material": gas alone, or gas mixed with non-gaseous filler elements, or cellular foam plastic; "filler elements": fibers, globules, numerous curved or straight filler tubes or rods, pellets or the like; and "gas" signifies any pure gas, or air or other mixture of gases.

I claim:

1. Resilient, vehicular bumper means, comprising:
   a vehicle-body-attachment member, of strength-providing material, constructed and arranged for attachment to a vertically-middle portion of the exterior of a vehicular body, and comprising at least one upright vehicle-attachment element;
   a bumper sheath of flexible, waterproof material, connected to said upright element, having yieldable, free-to-move outer, upper and lower surfaces that in use are exposed to ambient air and flex under impacts;
   within said sheath, at least one resilient tubular member, having a sealed tubular wall, at least a portion of which has a curved surface that is outwardly convex toward said sheath and endlessly arcuate in cross section, comprising metal, capable of repeated flexing without fracture;
   interior, shock-absorbing gaseous material on the vehicle side of said curved surface, resisting said flexing; and
   exterior gaseous material between said sheath and curved surface.

2. Bumper means as set forth in claim 1, in which: said gas is under a pressure above that of the atmosphere; and said upright element is a metallic part of a vehicular chassis.

3. Bumper means as set forth in claim 1, in which said interior gaseous material comprises filler elements of non-gaseous material mixed with said gas.

4. Bumper means as set forth in claim 1, in which said interior gaseous material comprises cellular foam plastic, and said gas comprises gas in the foam-plastic cells.

5. Bumper means as set forth in claim 3, in which said filler elements comprises fibers.

6. Bumper means as set forth in claim 1, in which the said exterior gaseous material comprises flexible foam plastic.

7. Resilient, vehicular bumper means, comprising:
   a vehicle-body-attachment member, of strength-providing material, constructed and arranged for attachment to a vertically-middle portion of the exterior of a vehicular body, and comprising at least one upright vehicle-attachment element;
   a bumper sheath of flexible, waterproof material, connected to said upright element, having yieldable, free-to-move outer, upper and lower surfaces that in use are exposed to ambient air and flex under impacts;
   within said sheath, a plurality of resilient tubular members, comprising lead, capable of repeated flexing without fracture, each of said tubular members having a portion with a curved surface that is outwardly convex toward said sheath;
   interior, shock-absorbing gaseous material on the vehicle side of said curved surface, resisting said flexing;
   and exterior gaseous material between said sheath and curved surface.

8. Bumper means as set forth in claim 7, in which the said sheath comprises flexible plastic, is elongated, and is constructed and arranged to extend around a substantial portion of the perimeter of a vehicle.

9. Bumper means as set forth in claim 7, in which: the said sheath comprises flexible plastic; and has a horizontal dimension that is at least as long as the width of the front end of a vehicle; and the said upright element comprises a bumper-support means located on the vehicle side of said tubular member, having a horizontal dimension that is substantially equal to the said horizontal dimension of the sheath.

10. Bumper means as set forth in claim 9, in which said bumper-support means comprises part of a vehicular body.

11. Bumper means as set forth in claim 7, in which: said bumper-support means comprises a strip of dense material, having a shape conforming to part of a vehicular body; and the bumper means comprises means for connecting said tubular member and strip.

12. Bumper means as set forth in claim 11 in which said interior gaseous material comprises foam plastic, adhering to and holding together said tubular member and strip.

13. Bumper means as set forth in claim 7, in which each of said tubular members has an axis that is upright.

14. Resilient, vehicular bumper means comprising:
   a vehicle-body-attachment member, of strength-providing material, constructed and arranged for attachment to a vertically middle portion of the exterior of a vehicular body, and comprising at least one upright vehicle-attachment element;
   bumper-sheath means of flexible, waterproof material, encompassing said vehicular body, extending from its forward end along both sides of the vehicle to and around it after end, resiliently jutting outward from said body, having yieldable, free-to-move outer, upper and lower bumper surfaces that are exposed to fuid of vehicular travel and flex under impacts;
   within said sheath means, a plurality of resilient tubular elements, comprising flexible, substantially non-extensible material, capable of repeated flexing under impact without fracture, each of said tubular elements having a curved surface that is outwardly convex toward said sheath means; the said plurality of tubular elements being constructed and arranged to form a resilient bumper framework around the whole of the vehicular body;

interior, shock-absorbing gaseous material on the vehicle side of said curved surfaces, comprising gas and a multiplicity of filler elements, free of fixed connection with each other and with said tubular elements, the maximum dimension of each filler element being a minor part of the maximum cross-sectional dimension of each of the tubular elements; the said filler elements being movable relatively to each other and the tubular elements, absoring some of the force of said impact flexing in friction between them; and exteror gaseous material between said sheath and curved surfaces.

15. Bumper means as set forth in claim 14, in which each of said tubular elements is generally shaped like half of a doughnut.

16. Bumper means as set forth in claim 14, in which each of said tubular elements comprises a bowed spring.

17. Bumper means as set forth in claim 1, comprising more than one said tubular member, in which: at least some of these tubular members comprise tubular elements, arcuately curved in cross sections; adjacent pairs of the ends of some of said tubular elements are joined and provide angles between tubular-element axes, said last-named tubular elements and ends being constructed and arranged to provide a bumper-element bridge over a vehicular wheel.

18. Bumper means as set forth in claim 1, comprising more than one said tubular member, in which: at least part of said sheath and at least some of said tubular members are constructed and arranged to fit by the elongated side of a vehicle, and to form a running-board vehicular step at said side.

19. Bumper means as set forth in claim 1, in which the said wall comprises a lead tubular element and fabric contiguous with the lead.

20. Bumper means as set forth in claim 1, in which each of said tubular members has arcuate-in-cross-section middle parts and flat ends.

21. Bumper means as set forth in claim 1, in which said metal has ductility at least equal to that of copper.

22. Bumper means as set forth in claim 21, in which said metal is lead.

23. Bumper means as set forth in claim 1, in which: said metal comprises lead and said tubular wall further comprises strength-providing fabric fixed to said lead; and said exterior gaseous material comprises mixed air and filler elements.

24. Resilient, vehicular bumper means, comprising:
a vehicle-body-attachment member, of strength-providing material, constructed and arranged for attachment to a vertically-middle portion of the exterior of a vehicular body, and comprising at least one upright, vehicle-attachment element;
a bumper sheath of flexible, waterproof material, connected to said upright element, having yieldable, free-to-move outer, upper and lower surfaces that in use are exposed to ambient air and flex under impacts;
within said sheath, a plurality of resilient tubular members, comprising flexible material, capable of repeated flexing without fracture, having portions with curved surfaces that are outwardly convex toward said sheath; at least some of said tubular members comprising tubular elements, arcuately curved in cross sections, having substantially flat ends; adjacent pairs of the ends of some of said tubular elements being joined, providing angles between tubular-element axes, said last-named tubular elements and ends being constructed and arranged to provide a bumper-element bridge over a vehicular wheel;

interor, shock-absorbing gaseous material on the vehicle side of said curved surfaces, resisting said flexing;

and exterior gaseous material between said sheath and curved surfaces.

25. Bumper means as set forth in claim 14, in which said tubular-element material comprises metal, having ductility at least equal to that of copper.

26. Bumper means as set forth in claim 14, in which said tubular-element material comprises a layer of lead and a layer of fabric, contiguous to said lead.

27. Bumper means as set forth in claim 14, in which said tubular-element material comprises plastic and reinforcing fabric.

28. Bumper means as set forth in claim 14, in which: said tubular elements are endlessly arcuate in cross sections; and at least some of said tubular elements are end-joined, forming at least one elongated tubular member.

29. Bumper means as set forth in claim 28, comprising a substantially parallel pair of tubular members of end-joined tubular elements, the said pair comprising tubular elements having their axes angled and arranged to form bumper-element bridges over vehicular wheels.

30. Bumper means as set forth in claim 28, comprising disk-like pieces of said tubular-element material, fixed to and joining adjacent pairs of ends of said end-joined tubular elements.

31. Bumper means as set forth in claim 28, in which said gas is under above-atmospheric pressure.

32. Bumper means as set forth in claim 14, in which said interior gaseous material comprises, within each of said tubular elements, gas and a multiplicity of filler elements in the gas.

33. Bumper means as set forth in claim 32, in wich said gas is under above-atmospheric pressure, and said filler elements are pellets, adapted to absorb force of vehicular collision by friction between pellets in their movement relatively to each other.

34. Bumper means as set forth in claim 14, in which said tubular elements have upright axes.

35. A shock absorbing bumper, comprising:
a backing plate to be fastened to a structure or vehicle to be protected;
a resilient, bowed, impact-distribution element having ends that are slidable along said backing plate;
shock-absorbing material in contact with said impact-distribution element, comprising a plurality of substantially rigid, frangible, tubular elements that are between the bight of said impact-distribution element and said backing plate, so that movement of a major portion of the impact-distribution element toward said backing plate tends to compress said tubular elements.

36. A shock-absorbing bumper, comprising:
a backing plate adapted to be fastened to a structure or vehicle to be protected;
a resilient, bowed, impact-distribution element, having ends that are slidable along said backing plate;

shock-absorbing material in contact with said impact-distribution element, comprising a plurality of substantially rigid, frangible, globular elements that are between the bight of said impact-distribution element and said backing plate, so that movement of a major portion of the impact-distribution element toward said backing plate tends to compress said globular elements.

37. A shock-absorbing bumper as set forth in claim 35, in which said impact-distribution element is imbedded within said shock-absorbing material.

38. A shock-absorbing bumper, comprising:
a backing plate adapted to be fastened to a strucure or vehicle to be protected;
a resilient, bowed, impact-distribution element, having end portions that are mounted on and slidable on said backing plate;
shock-absorbing material in contact with said impact-distribution element, comprising a plurality of substantially rigid, crushable, tubular elements that are between the bight of said impact-distribution element and said backing plate, so that movement of a major portion of the impact-distribution element toward said backing plate tends to compress said tubular elements.

39. A shock-absorbing bumper as set forth in claim 38, in which said impact-distribution element is imbedded in said shock-absorbing material.

* * * * *